United States Patent
Cordes et al.

(10) Patent No.: US 8,131,103 B2
(45) Date of Patent: Mar. 6, 2012

(54) IMAGE DETAIL ENHANCEMENT

(75) Inventors: Claus Nico Cordes, Eindhoven (NL); Nalliah Raman, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 1011 days.

(21) Appl. No.: 12/088,438

(22) PCT Filed: Sep. 21, 2006

(86) PCT No.: PCT/IB2006/053414
§ 371 (c)(1),
(2), (4) Date: Mar. 28, 2008

(87) PCT Pub. No.: WO2007/036853
PCT Pub. Date: Apr. 5, 2007

(65) Prior Publication Data
US 2010/0188531 A1    Jul. 29, 2010

(30) Foreign Application Priority Data
Sep. 30, 2005    (EP) .................................... 05109066

(51) Int. Cl.
*G06K 9/40* (2006.01)
(52) U.S. Cl. ........ 382/266; 382/260; 382/270; 382/274; 348/597; 348/674
(58) Field of Classification Search .................. 382/260, 382/266, 270, 274; 348/597, 674
See application file for complete search history.

(56) References Cited

U.S. PATENT DOCUMENTS
4,224,638 A * 9/1980 Pritchard et al. .............. 348/665
(Continued)

FOREIGN PATENT DOCUMENTS
WO    02089060 A2    11/2002
(Continued)

OTHER PUBLICATIONS
Effective Peaking—Architecture, Hentschel at el., IEEE, 0098306300. 2000, pp. 33-39.*
(Continued)

*Primary Examiner* — Jayesh A Patel

(57) ABSTRACT

A method of enhancing details in an input image. The input image comprises input pixels, which have input pixel values (IPV) limited to a range (RA). The method comprises average filtering (1) the input pixel values (IPV) to obtain average brightness values (LV). A luminance mask is applied (2) to the average brightness values (LV) to obtain masked values (MV) which are different for average brightness values (LV) in a sub-range (SR) of the range (RA) than for pixels outside the sub-range (SR). The input pixel values (IPV) are detail filtered (3) to obtain detail values (HV) indicative for an amount of detail. A non-linear function (NLF) is applied (5) on the input pixel values (IPV) to obtain for each input pixel value (IPV) a corresponding output pixel value (OPV). A gain of the non-linear function (NLF) is dependent on both the masked value (MV) and detail value (HV) which both are determined for the particular input pixel. The gain is higher for input pixels with input pixel values (IPV) outside the sub-range (SR) than for input pixels with input pixel values (IPV) inside the sub-range (SR). And the gain is higher for input pixels for which the detail value (HV) indicates more high frequency content in the image portion around the particular input pixel than for input pixels for which the detail value (HV) indicates less high frequency content.

16 Claims, 5 Drawing Sheets

U.S. PATENT DOCUMENTS

| | | | | |
|---|---|---|---|---|
| 4,365,266 A | * | 12/1982 | Lagoni | 348/628 |
| 4,403,246 A | * | 9/1983 | Thornberry | 348/628 |
| 4,437,124 A | * | 3/1984 | Cochran | 348/627 |
| 4,509,080 A | * | 4/1985 | Lagoni et al. | 348/625 |
| 5,079,633 A | * | 1/1992 | Hagino et al. | 348/613 |
| 5,202,763 A | * | 4/1993 | Sendelweck et al. | 348/674 |
| 5,267,028 A | * | 11/1993 | Suga et al. | 348/223.1 |
| 5,369,436 A | * | 11/1994 | Kawakami et al. | 348/355 |
| 5,661,575 A | * | 8/1997 | Yamashita et al. | 358/519 |
| 5,717,789 A | * | 2/1998 | Anderson et al. | 382/254 |
| 6,018,596 A | * | 1/2000 | Wilkinson | 382/260 |
| 6,072,538 A | * | 6/2000 | Keating | 348/625 |
| 6,148,116 A | * | 11/2000 | Park et al. | 382/266 |
| 7,773,158 B2 | * | 8/2010 | Yamashita et al. | 348/678 |
| 2002/0067434 A1 | * | 6/2002 | Niko | 348/631 |
| 2003/0118248 A1 | * | 6/2003 | Kyong | 382/266 |
| 2004/0189874 A1 | | 9/2004 | Wang et al. | |
| 2005/0058365 A1 | | 3/2005 | Wang et al. | |
| 2005/0180629 A1 | * | 8/2005 | Masuno et al. | 382/169 |
| 2006/0158567 A1 | * | 7/2006 | Cordes et al. | 348/663 |
| 2007/0080975 A1 | * | 4/2007 | Yamashita et al. | 345/591 |

FOREIGN PATENT DOCUMENTS

| | | |
|---|---|---|
| WO | WO 02089060 A2 * | 11/2002 |
| WO | 03094112 A2 | 11/2003 |
| WO | WO 03094112 A2 * | 11/2003 |
| WO | 2005004057 A1 | 1/2005 |

OTHER PUBLICATIONS

Harry C. Andrews, Monochrome Digital Image Enhancement, Applied Optics, OSA, vol. 15, No. 2, Feb. 1976, pp. 495-503.

Victor T. Tom: Adaptive Filter Techniques for Digital Image Enhancement, Proceedings of the SPIE, vol. 528, No. Jan. 22, 1985, pp. 29-42.

F. Drago, et al: Adaptive Logarithmic Mapping for Displaying High Contrast Scenes, Eurographics, vol. 22, No. 3, 2003, pp. 1-9.

* cited by examiner

IMAGE DETAIL ENHANCEMENT

FIELD OF THE INVENTION

The invention relates to a method of enhancing details in an input image, an apparatus for enhancing details in an input image, a display apparatus comprising such an apparatus for enhancing details in an input image, a computer program product comprising a processor readable code to enable a processor to execute method of enhancing details in an input image, a camera comprising the apparatus for enhancing details in an input image, and a portable device comprising such a camera.

BACKGROUND OF THE INVENTION

WO03/094112 discloses a local color correction approach. An input image represented by a set of input pixel values is color corrected by locally modifying the input pixel values according to pixel neighborhoods to obtain an output image which has a set of output pixel values. Each set of output pixel values equals a non-linear combination of a set of input pixel values and its corresponding set of modified pixel values.

In one embodiment of this prior art, the input pixel values are low-pass filtered to obtain a tone mask which is an image which contains numerical values which are indicative of shadows, highlights, and midtones in the received digital image. For each one of the input component color values (usually red, green, and blue) of an input pixel, the corresponding output color values are obtained by applying an exponential function on the input color values. The masked values of the input component color values are used to vary the exponent of the corresponding exponential function. Thus, the output color values are obtained by applying a pixel-wise gamma correction, wherein each pixel has its own particular gamma value due to its particular masked value. These local gamma values are determined by the tonal properties of the pixel and its surrounding pixels. It is disclosed that other non-linear functions may be used to determine the output color values as a function of the input color values, such as sigmoidal or hyperbolical functions. In another embodiment, the sigmoidal functions are used for masked values representing middle gray, while the exponential functions are used for masked values, which represent black and white.

Although this approach increases the visibility of image content in the extreme ends of the dynamic range, it also increases the noise in these parts of the image content, and further tends to decrease the contrast of the image by increasing the brightness in dark parts of the image and by decreasing the brightness in bright parts of the image.

SUMMARY OF THE INVENTION

It is an object of the invention to enhance details in an input image while causing less contrast decrease.

A first aspect of the invention provides a method of enhancing details in an input image as claimed in claim 1. A second aspect of the invention provides an apparatus for enhancing details in an input image as claimed in claim 9. A third aspect of the invention provides a display apparatus as claimed in claim 10. A fourth aspect of the invention provides a computer program product as claimed in claim 11. A fifth aspect of the invention provides a camera as claimed in claim 13. A sixth aspect of the invention provides a portable device as claimed in claim 14. Advantageous embodiments are defined in the dependent claims.

The method in accordance with the first aspect of the invention enhances details in an input image, which comprises pixels having input pixel values being limited to a range. Thus, the input pixel values of the input pixels have a valid range wherein they can be represented. For example, 8 bit digital words may have values starting from 0 up to 255. In this example, the range has a lower extreme value, which is zero, and a higher extreme value, which is 255. But of course any other valid range may be defined dependent on the desired resolution level and/or hardware or software implementation.

The method in accordance with the invention comprises average filtering the input pixel values to obtain average brightness values and applying a luminance mask to the average brightness values to obtain masked values which are different for input pixel values in a sub-range, preferably including a center of the range, or even being the centre of the range, than for pixels outside the sub-range. Thus, the masked values indicate whether a particular one of the input pixel values is within the sub-range or not. For example, if the sub-range only comprises the centre value, the masked values may be obtained by calculating the difference of the average brightness value of the pixel and the centre value. In another embodiment, the sub-range may comprise a range of values, and the masked values may be obtained by calculating the difference of the average brightness value of the pixel and the nearest border of the sub-range. Alternatively, the masked values may be determined differently, for example as a quadratic function or any other function. Further, the method in accordance with the invention comprises additionally detail filtering of the input pixel values to obtain detail values, which are indicative for the amount of detail in the image around the pixel. The averaging filter may be a linear FIR filter which has a low-pass frequency response, or a (non-linear) median filter. The detail filter preferably is a high-pass filter or a 'max-min' filter, which gives an indication of the detail around the particular pixel being processed.

The method in accordance with the invention further comprises applying a non-linear function on the input pixel values to obtain for each input pixel value a corresponding output pixel value. This may be performed in the same manner as disclosed in WO03/094112. However, in the method in accordance with the invention, the gain of the non-linear function for a particular input pixel depends on both the masked value and the detail value determined for this particular input pixel. Thus, in the present invention, the non-linearity is higher for input pixels with input pixel values outside the sub-range than for input pixels with input pixel values inside the sub-range. The higher non-linearity provides a locally higher derivative of the non-linear function and thus a locally higher amplification factor or gain. A high amplification factor amplifies small differences between the input pixel values, and thus, the visibility of these differences is enhanced.

If the sub-range includes the higher extreme value of the range, the gain is relatively high for input pixels, which have low values and relatively low for input pixels, which have high values. As the gain is now increased for the dark parts of the image, and the function has a higher derivative for low values than for high values, the details in the dark part are enhanced. If the sub-range includes the lower extreme value, the gain is relatively high for input pixels, which have high values and relatively low for lower values. As the gain is now increased in light parts of the image, and the function has a higher derivative for high values than for low values, the details at high brightness levels are enhanced. If the sub-range is centered on the center of the range or coincides with the center of the range, the gain is higher for input pixel values below or above the sub-range dependent on the actual value of the input pixel value. Again, if the pixel value is below the sub-range, the function should have a higher derivative for low values than for high values, and if the pixel value is above the sub-range the function should have a higher derivative for high values than for low values.

However, the approach, which is disclosed in WO03/094112, has the drawback that it also changes the gain of the function even if there is no relevant information in the image around the particular input pixel. Consequently, in a dark part of the image the higher derivative (and thus the higher amplification factor) is also used in uniform areas. Due to the high amplification factor, noise in these areas becomes clearly more annoyingly visible, and also the contrast ratio decreases. While, on the other hand, there is no need to locally apply this high amplification because there is no useful information, which could become visible.

This problem is solved by the present invention by increasing the gain for input pixels for which the high-pass filtered value indicates more high frequency content in the image portion around the particular input pixel than for input pixels for which the high-pass filtered value indicates less high frequency content. Thus, only if there is high frequency content, the gain is increased to make the information, which is present, more visible. If there is no, or only a low amount of high frequency content, the gain will not be increased at all or to a lower amount. Thus, in areas in which no information is present which would become visible by increasing the gain, the gain is not increased at all, or the gain is increased with a low amount only, to prevent noise to become clearly visible, and to prevent shifting the black level too much upwards which would deteriorate the contrast ratio.

In an embodiment as claimed in claim 2, the luminance mask is constructed to generate an input to output conversion which maps low input values to high output values and which maps input values above the particular input value corresponding to the lower border to a minimum value. The mapping maps the input values starting from the lower extreme value up to the lower border with decreasing values. Such a luminance mask provides for the low input values relatively high masked values, which consequently cause a high gain. For higher input values up to the lower border the gain decreases, while for input values above the lower border value up to the higher border value the gain is minimal.

In an embodiment as claimed in claim 3, the minimal gain is obtained for all input values above the lower border value. Thus, the high gain is obtained for dark parts of the picture only.

In an embodiment as claimed is claim 4, the gain increases from the higher border value up to the higher extreme value. Thus, the high gain occurs in dark parts of the picture and in bright parts of the picture. Of course, the actual gain of the function has to be different in the dark and bright parts to enable to enhance details. For example, if the function is an exponentional function, the exponent should be negative for dark parts and positive for bright parts such that the expansion in dark or bright parts is compensated by compression in the bright or dark parts, respectively.

In an embodiment as claimed in claim 5, the detail filtering supplies detail values which are higher for pixels in an image portion with a relatively high high-frequency content than in an image portion with a relatively low high-frequency content. The detail values are further also referred to as filtered values. On top of the masked values, the filtered values also determine the amount of gain of the function. The higher the filtered values are the higher the gain is. It has to be noted that for a particular pixel both the masked value and the filtered value depend on the image content in the area around the particular pixel, and that the gain is locally adapted for values around the brightness value of the particular pixel.

In an embodiment as claimed in claim 6, the masked value and the filtered value are multiplied on a pixel by pixel basis, and the gain for a particular pixel is proportional to the multiplied value associated with this pixel.

In an embodiment as claimed in claim 7, the input pixel values are clipped before being supplied to the detail filter. This has the advantage that high frequency information present in brightness ranges where no enhancement is desired does not affect the gain of the non-linear function. For example, if the input pixel values are clipped for this subrange of the input pixel values, any high frequent information in this brightness range is clipped to the same value and thus cause a DC input signal at the input of the detail filter. Consequently, the output value of the detail filter will be zero. Thus, in this example, only high-frequency image content which covers the low and/or high grey levels cause varying values at the output of the clipper and thus cause a non-zero output of the detail filter. The subrange may be formed by values in a "middle gray range".

In an embodiment as claimed in claim 8, two detail filtering steps are present. One of the detail filters operates for the dark scenes by clipping the input pixel values above a threshold value to maximum value. The other one of the detail filters operates for the bright scenes by clipping the input pixel values below threshold value to a minimum value. The gain is now dependent on either the filtered values of the first mentioned detail filter or the filtered values of the second mentioned detail filter, dependent on whether the input value belongs to a dark or a bright scene.

These and other aspects of the invention are apparent from and will be elucidated with reference to the embodiments described hereinafter.

BRIEF DESCRIPTION OF THE DRAWINGS

In the drawings.

It should be noted that items, which have the same reference numbers in different Figures, have the same structural features and the same functions, or are the same signals. Where the function and/or structure of such an item has been explained, there is no necessity for repeated explanation thereof in the detailed description.

DETAILED DESCRIPTION

Figure 1:
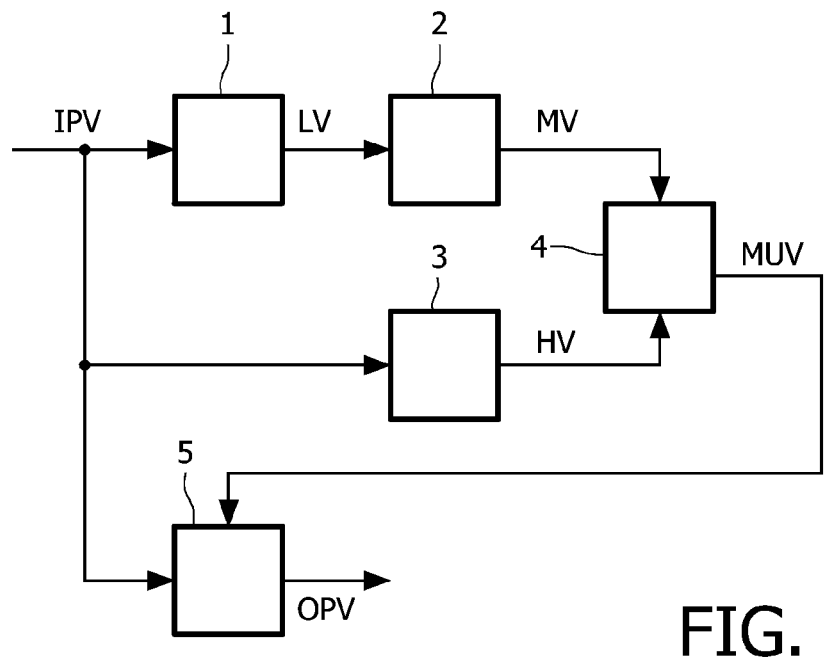
FIG. 1 shows a block diagram of an embodiment in accordance with the invention for enhancing details in an input image.

FIG. 1 shows a block diagram of an embodiment in accordance with the invention for enhancing details in an input image. The blocks shown in FIG. 1 can be interpreted as hardware circuits, or as steps of a method. The steps of the method can be performed with dedicated hardware or with a suitably programmed processor.

The averaging filter (or the averaging function) 1 receives the input image, which in a digital system is represented by the input pixel values IPV, to supply the average brightness values LV. the averaging filter 1 may filter the input pixel values IPV with a Gaussian kernel. Alternatively other average filtering techniques may be implemented. Preferably, the averaging filter 1 is an edge preserving filter, such as a median filter. The averaging filter 1 provides or computes the tone mask associated with the input image at the selected video data dynamic range RA bounded by the lower and higher extreme values LEV and HEV.

The mask circuit (or the masking function) 2 receives the average brightness values LV to supply masked values MV. The masking function 2 at least suppresses the middle grey levels, or the centre value only, such that the enhancement is only obtained for the low and/or high grey levels. The masking function 2 is elucidated in more detail with respect to FIGS. 4 to 6.

The detail filter (or detail filtering function) 3 receives the input pixel values IPV to supply detail values HV which indicate the amount of high frequencies in a relevant portion of the input image around the actual input pixel considered.

The combiner (or combining function) 4 may combine the masked values MV and the detail values HV into single control values MUV, which control the local gain (non-linearity) of the non-linear function 5. For example, the masked values MV and the detail values HV are multiplied on a pixel-by-pixel basis to obtain the control values MUV to control the gain on a pixel-by-pixel basis. Alternatively, the masked values MV and the detail values HV may control the gain of the non-linear function 5 without being first combined.

The non-linear circuit (or the non-linear function) 5 receives the input pixel values IPV to supply output pixel values OPV. The input pixel values IPV are re-mapped to the output pixel values OPV via the non-linear function 5 of which the gain is locally controlled for each pixel with the corresponding control value or set of control values MUV. The non-linear function 5 is a monotonous function, such as for example an exponential (gamma) function or a sigmoidal function. The control value MUV for a particular input pixel depends on or comprises both the masked value MV and the detail value HV to obtain a gain of the non-linear function 5 which is higher for low and/or high input pixel levels IPV, but only if high frequency content is present in the area around the particular pixel. Thus, the gain will not be increased or will be only marginally increased if no or only a low amount of high frequency content is present. The non-linear function 5, which is also referred to as NLF, is elucidated in more detail with respect to FIG. 3.

Preferably, the input pixel values IPV are defined in a linear light domain to facilitate easy processing. Morphological operators may be applied to the average filtering 1, and/or the masking 2, and/or the detail filtering 3.

Figure 2:
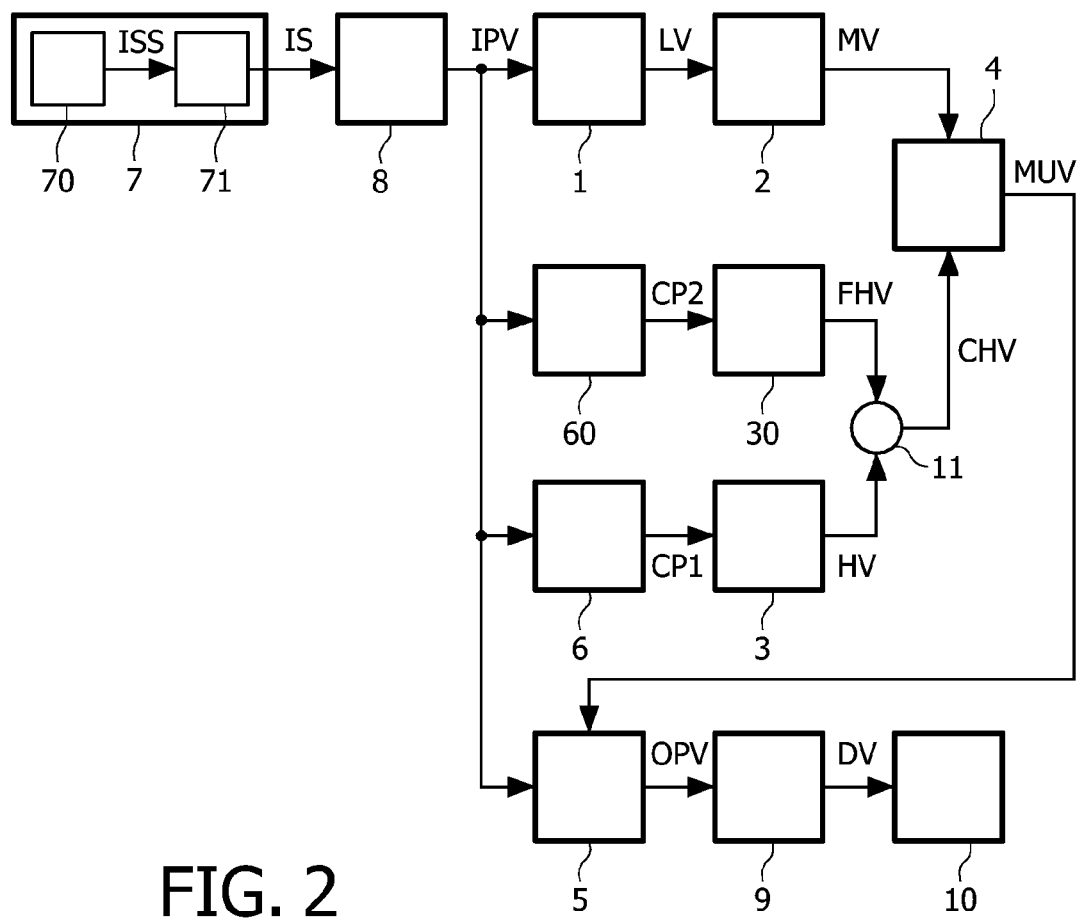
FIG. 2 shows a block diagram of another embodiment in accordance with the invention for enhancing details in an input image.

FIG. 2 shows a block diagram of another embodiment in accordance with the invention for enhancing details in an input image. The signal source 7 may be a camera with an image sensor 70 and a signal processing circuit 71. The sensor 70 supplies an image sensor signal ISS to the signal processing circuit 71. The signal processing circuit 71 processes the sensor signal ISS to obtain the input signal IS. The signal source 7 may be any source of analog or digital still or moving images. The optional input processing block 8 may comprise an analog to digital converter if the input signal IS is an analog signal. The block 8 may also comprise an inverse gamma correction to obtain input pixel values IPV in the linear light domain. The blocks 1 to 5 are identical to those discussed with respect to FIG. 1, and are thus not described again. The detail values HV are now supplied to a combiner 11 instead of the combiner 4.

Figure 7:
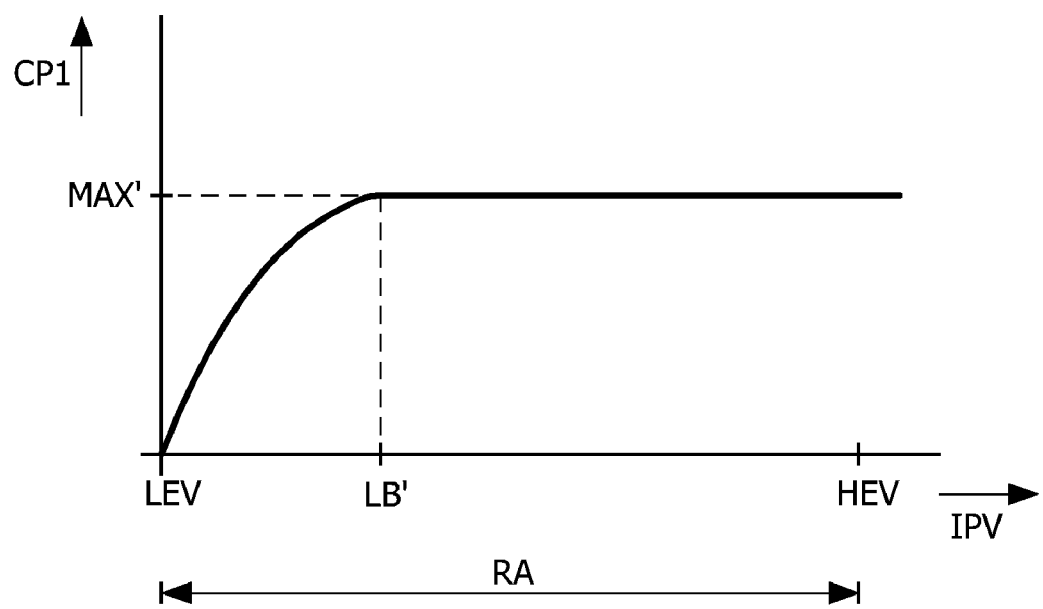
FIG. 7 shows an example of a clipping function for low grey levels.

The detail filter 3 is preceded by a clipping circuit (or clipping function) 6, which receives the input pixel values IPV and supplies the modified pixel values CP1. An example of the clipping function 6 is shown in FIG. 7. The detail filter 3 receives the modified pixel values CP1 and supplies the detail values HV. If there is no high frequent information in the input pixel values IPV, or the high frequency information occurs at higher grey levels only, all modified pixel values CP1 have the same value because they are clipped. Consequently, the detail values HV are all zero because a DC-level has no different values representative for details. Only if there is high frequent information in the lower grey levels, the varying input pixel values IPV produce varying modified pixel values CP1. Now, the detail filter 3 supplies a higher detail value HV and the gain of the non-linear function 5 is increased to enhance the details in the low grey levels.

Figure 8:
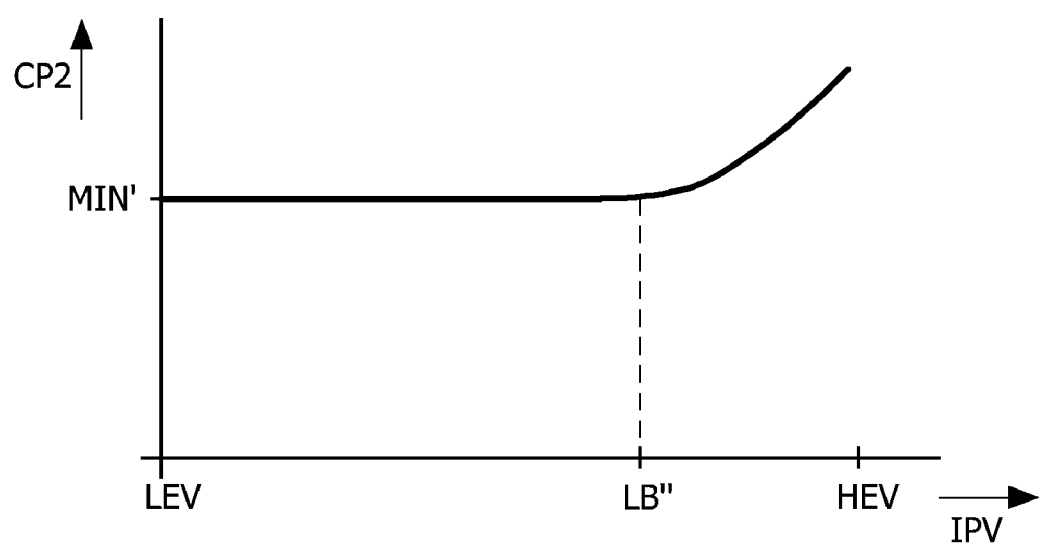
FIG. 8 shows an example of a clipping function for high grey levels.

The detail filter 30 may be identical to the detail filter 3. The clipping circuit (or clipping function) 60 receives the input pixel values IPV and supplies the modified pixel values CP2 to the detail filter 30. An example of the clipping function 60 is shown in FIG. 8. The detail filter 30 receives the modified pixels values CP2 and supplies the detail values FHV. If there is no high frequent information in the input pixel values IPV, or the high frequency information occurs at lower grey levels only, all modified pixel values CP2 have the same value because they are clipped. The detail values FHV are all zero because a DC-level has no different values representative for details. Only if there is high frequent information in the high grey levels, both the input pixel values IPV and the modified pixel values CP2 vary. Now, the detail filter 30 supplies a higher detail value FHV which indicates that the gain of the non-linear function should be increased for higher grey levels to enhance the details in the higher grey levels.

The combiner 11 may sum the detail values HV and FHV on a pixel-by-pixel basis. Alternatively, the combiner 11 may determine the maximum of the detail values HV and FHV on a pixel-by-pixel basis. The combined value CHV determined in this manner by the combiner 11 is supplied to the combiner 4 to combine the masked values MV and the combined value CHV to obtain the control value MUV to locally control the gain of the non-linear function NLF generated by the block 5. The control value MUV may be a single value for each pixel, or may comprise two values which are, or which represent the masked value MV and the combined value CHV. The combined value CHV indicates whether for low grey levels (detail filter 3 and clipper 6) or for high grey levels (detail filter 30 and clipper 60) high frequency content is present. If no high frequency content is present, the gain in the corresponding range of the grey levels is smaller than if high frequency content is present and noise amplification and black level increase for low grey levels and white level decrease for high grey levels is prevented if no information is available in the image which could become visible by the enlarged amplification. Thus, the approach in accordance with the invention only increases the gain for a particular pixel to enhance the details if both high frequency information is present around the pixel and the input pixel value IPV is low (low grey level) or high (high grey level). This approach may only be used for low grey levels or only for high grey levels.

Figure 3:
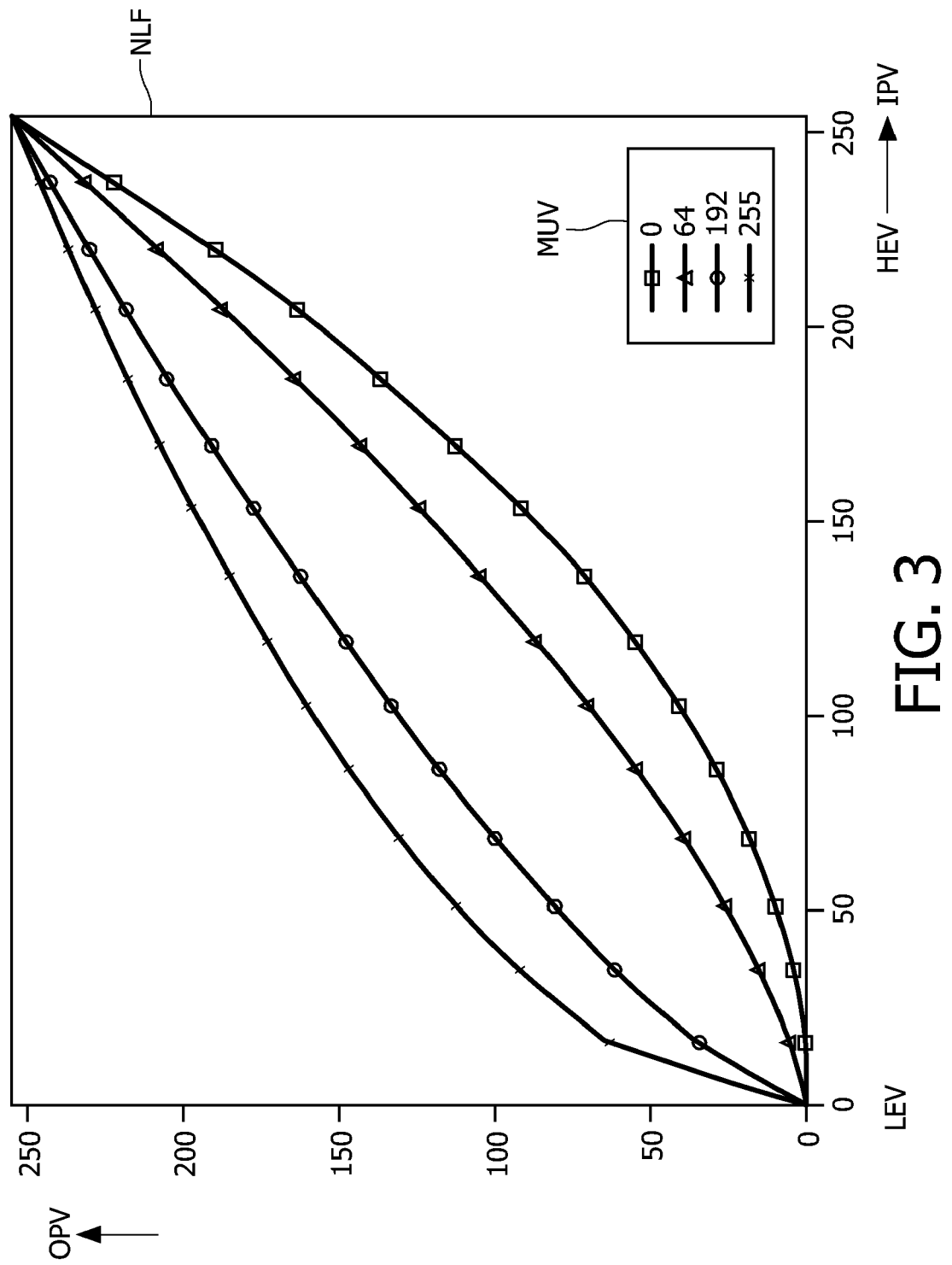
FIG. 3 shows examples of the non-linear function.

The non-linear circuit 5 which converts the input pixel values IPV into output pixel values OPV under control of the control value MUV is elucidated in more detail in FIG. 3.

The processing circuit 9 may comprises an optional gamma correction and a driver. The gamma correction performs a gamma correction as required by the display device 10, the driver processes the gamma corrected values to obtain suitable drive signals for the particular display device 10 used. The display device 10 may be any matrix display device.

FIG. 3 shows examples of the non-linear function. The non-linear function NLF shows the relation between the output pixel values OPV along the vertical axis and the input pixel values IPV along the horizontal axis at four different control values MUV. The non-linear function shown is an exponential function for 8 bit digital words and defined by $$OPV = 255 \times \left(\frac{IPV}{255}\right)^{2\left(\frac{128-MUV}{128}\right)} \quad (1)$$

or $$OPV = 255 \times \left(\frac{IPV}{255}\right)^{2\left(\frac{128-MV}{128} \times CHV\right)} \quad (2)$$

The non-linear function NLF according to equation (1) is a quadratic function for the control value MUV=0, a square root for the control value MUV=255, and a straight line for the control value MUV=128.

Now, the single control value MUV has to be determined based on the masked value MV and on the detail value(s) HV and/or FHV. Several possibilities exist to combine the masked value MV and the (clipped) detail value(s) HV and/or FHV. In a first embodiment, if the masked value MV indicates that the input pixel values IPV have low grey levels, the control value MUV may only vary between 128 and 255. If the masked value MV indicates that the input pixel values IPV have high levels, the control value MUV may only vary between 0 and 128. The detail value(s) HV and/or FHV now determine the control value MUV in the range predetermined by the masked value MV. If no high frequent information is detected, no enhancement is desired and the value of MUV should be 128 or near to 128 to prevent an amplification of either the low or high grey levels. If the detail value HV indicates that high frequent information is present in the low grey levels, the value of MUV should be shifted towards 0. For example, the detail value HV may be normalized to a range from zero to one. If the detail value HV is zero, no high frequent information is present in the surrounding of the present input pixel for low grey levels and the value of MUV is 128. If the detail value HV is one, a maximum amount of high frequent information is present in the surrounding of the present input pixel for low grey levels and the value of MUV is 255. Also, if the detail value FHV is zero, no high frequency information is present in the surrounding of the present input pixel for high grey levels and the value of MUV is 128. If the detail value FHV is one, a maximum amount of high frequent information is present in the surrounding of the present input pixel for high grey levels and the value of MUV is 0.

In another embodiment, the non-linear function shown is an exponential function for 8 bit digital words and defined by equation (2). In fact this function behaves exactly as described hereinbefore for the function defined by equation (1) but now, the non-linear circuit 5 receives the control value MUV which comprises both the masked value MV, and the detail value(s) HV and/or FHV. The masked value MV varies for an 8 bit digital signal in the range from 0 (minimum gray level) to 255 (maximum grey level). The detail value(s) HV and/or FHV are normalized to vary within the range 0 (no high frequency content for the relevant grey levels) to 1 (maximum high frequency content for the relevant grey levels).

Figure 4:
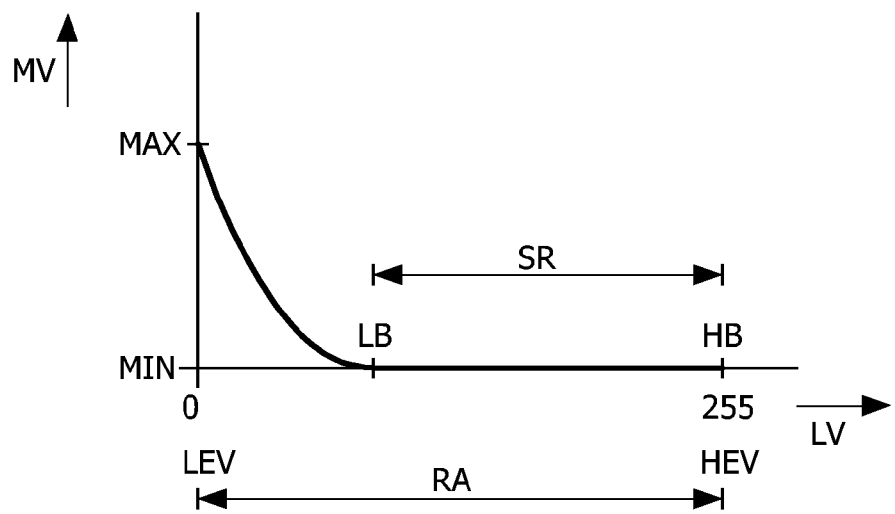
FIG. 4 shows an example of a mask for enhancing details in the low grey levels.

FIG. 4 shows an example of a mask for enhancing details in the low grey levels. The mask 2 shows the 8-bit average brightness values LV along the horizontal axis and the masked values MV along the vertical axis. The masked values MV have the minimum value MIN in the sub-range SR which has a lower border LB and a higher border HB. The higher border HB coincides with the higher extreme value HEV (which in this example is 255) of the range RA. In between the low extreme value LEV (which in this example is 0) of the range RA and the lower border LB, the mask monotonously decreases from a maximum value MAX to the minimum value MIN. Preferably, the maximum value MAX is equal to the higher extreme value HEV, and the minimum value MIN is equal to the lower extreme value LEV. Such a mask only produces non-zero values if the average brightness values LV occur between the low extreme value LEV of the range RA and the lower border LB, thus for low grey values.

Figure 5:
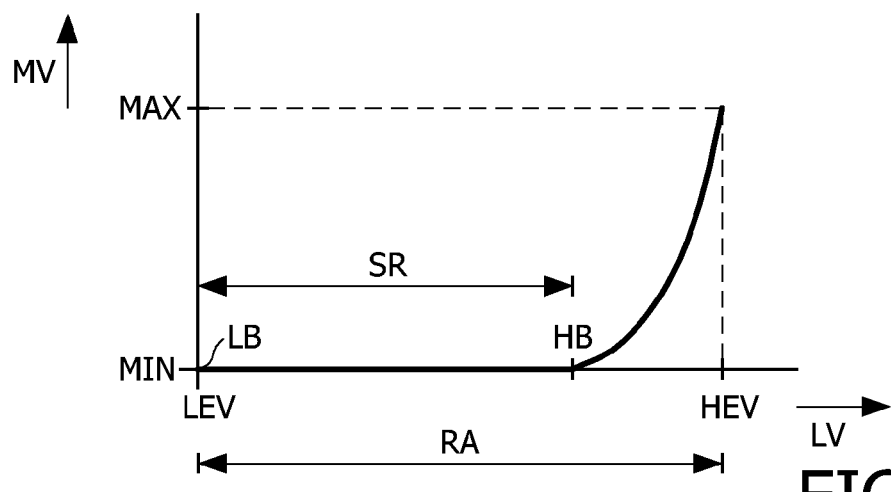
FIG. 5 shows an example of a mask for enhancing details in the high grey levels.

FIG. 5 shows an example of a mask for enhancing details in the high grey levels. The mask shows the 8-bit average brightness values LV along the horizontal axis and the masked values MV along the vertical axis. The masked values MV have the minimum value MIN in the sub-range SR which has the lower border LB and the higher border HB. The lower border LB coincides with the lower extreme value LEV of the range RA. In between the higher border HB and the high extreme value HEV of the range RA, the mask monotonously increases from a minimum value MIN to the maximum value MAX. Preferably, the maximum value MAX is equal to the higher extreme value HEV, and the minimum value MIN is equal to the lower extreme value LEV. Such a mask only produces non-zero values if the average brightness values LV occur between the higher border HB and the high extreme value HEV, thus for high grey values.

Figure 6:
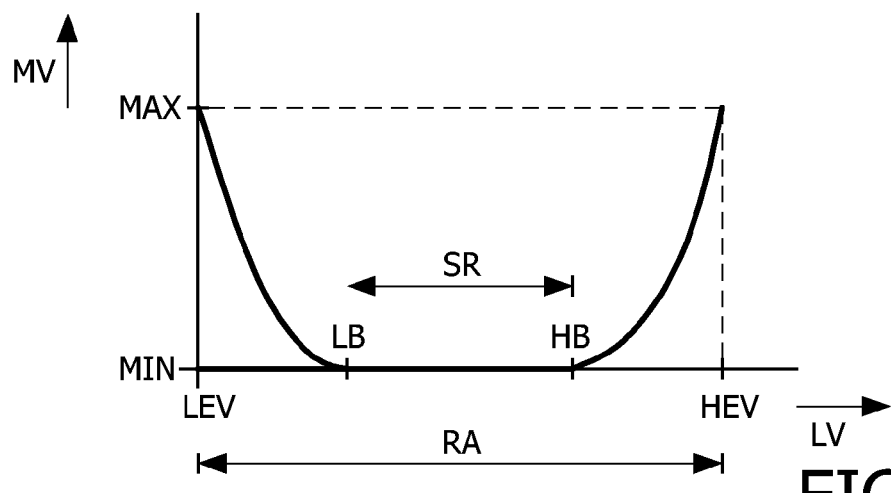
FIG. 6 shows an example of a mask for enhancing details both in the low and the high grey levels.

FIG. 6 shows an example of a mask for enhancing details both in the low and the high grey levels. This mask is the combination of the masks shown in FIGS. 4 and 5 and need not be further elucidated. This mask only produces non-zero values if the average brightness values LV occur for low or high grey values.

With respect to FIGS. 4 to 6, the range RA of input pixel values IPV is considered to comprise a sub-range SR which at least comprises the center value of the range RA. Thus, the sub-range SR may comprise only the center value.

FIG. 7 shows an example of a clipping function for low grey levels. The input pixel values IPV are depicted along the horizontal axis, the modified pixel values CP1 are depicted along the vertical axis. The clipping function increases starting from the lower extreme value LEV of the range RA until a maximum value MAX' at the threshold value LB' and keeps the maximum value MAX' up to the higher extreme value HEV. Thus, the clipping function 6 limits or clips the modified pixel values CP1 to the maximum value MAX' for input pixel values IPV higher than the threshold LB'.

If there is no high frequency information in the input pixel values IPV, or the high frequency information occurs at higher grey levels only, all modified pixel values CP1 have the same value because they are clipped to the maximum value MAX'. Now, the detail values HV are all zero because the detail filter 3 receives a DC-level. Only if there is high frequency information in the lower grey levels, the modified pixel values CP1 vary, and the detail filter 3 supplies a non-zero detail value HV. Thus, the output values of the detail filter 3 indicates whether for low grey levels high-frequency information is present in the neighborhood of the considered pixel.

FIG. 8 shows an example of a clipping function for high grey levels. The input pixel values IPV are depicted along the horizontal axis, the modified pixel values CP2 are depicted along the vertical axis. The clipping function has a minimum value MIN' starting from the lower extreme value LEV up to the input pixel value LB". Then, the clipping function increases up to the higher extreme value HEV. Thus, the clipping function 6 limits the modified pixel values CP1 to the minimum value MIN' for input pixel values IPV lower than the threshold value LB".

If there is no high frequency information in the input pixel values IPV, or the high frequency information occurs at lower grey levels only, all modified pixel values CP2 have the same value because they are clipped to the minimum value MIN'. The detail values FHV are all zero because a DC-level is high-passed by the detail filter 60. Only if there is high frequency information in the high grey levels, both the input pixel values IPV and the modified pixel values CP2 vary. Now, the detail filter 30 supplies a non-zero detail value FHV which indicates that for the pixel considered for high grey levels high-frequency information is present in the neighborhood of the pixel.

Figure 9:
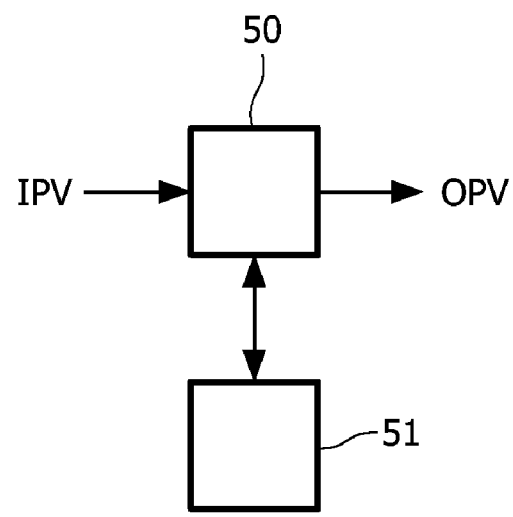
FIG. 9 shows a block diagram of a processor which executes the method of enhancing details in an input image.

FIG. 9 shows a block diagram of a processor, which executes the method of enhancing details in an input image. The processor 50 receives the input pixel values IVP and supplies the output pixel values OVP. The processor 50 executes a program stored in the storage medium 51, which for example is a memory or an optical storage medium. The program executed performs the functions described hereinabove.

Figure 10:
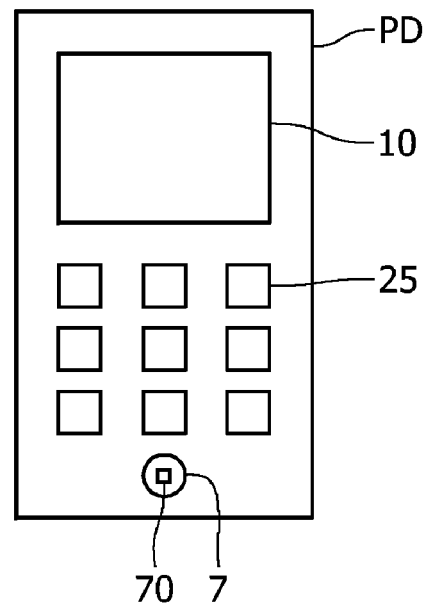
FIG. 10 shows a portable device comprising a camera.

FIG. 10 shows a portable device comprising a camera. The portable device PD comprises a display device 10 with a display screen, a camera 7 and optionally buttons 25. The image sensor 70 of the camera 7 supplies an image sensor signal ISS to a processing circuit 71 to supply the input pixel values IPV (see also FIG. 1). The portable device may, for example, be a PDA (Personal Digital Assistant), or a mobile phone. The camera 7 may also be positioned at the back or on any other side of the portable device PD.

It should be noted that the above-mentioned embodiments illustrate rather than limit the invention, and that those skilled in the art will be able to design many alternative embodiments without departing from the scope of the appended claims.

The present invention is elucidated for input pixel values IPV. For monochrome images only one type of input pixel values IPV exist, namely those, which indicate the luminance or brightness of the input pixels of the input image. If the input image is multicolored, the input image comprises per pixel sets of input pixel values IPV. For example, for a usual full color image, the color and brightness of each pixel is defined by a red component R, a green component G, and a blue component B. Per pixel only one non-linear function may be determined. The input pixel values IPV used may be one of these RGB components, or a combination of the RGB components. If a combination of the RGB components is used, preferably this combination represents the luminance of the pixel. Alternatively, per pixel, a non-linear function is determined for each one of the components by using for each one of the non-linear functions the associated component as the input pixel values IPV.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of enhancing details in an input image with input pixels having input pixel values being limited to a range, the method comprising:
    average filtering the input pixel values to obtain average brightness values,
    applying a luminance mask to the average brightness values to obtain a masked value corresponding to a particular one of the input pixels and being different for average brightness values in a sub-range of the range than for pixels outside the sub-range,
    detail filtering the input pixel values to obtain a detail value indicative for an amount of detail corresponding to the particular one of the input pixels, and
    applying a non-linear function to the input pixel values to obtain for at least one of the input pixel values a corresponding output pixel value, a gain of the non-linear function being dependent on both the masked value and detail value both determined for the particular one of the input pixels, wherein the gain is higher for an input pixel with input pixel values outside the sub-range than for an input pixel with input pixel values inside the sub-range, and wherein the gain is higher for an input pixel for which the detail value indicates more high frequency content in an image portion around the particular input pixel than for an input pixel for which the detail value indicates less high frequency content.

2. The method of claim 1, wherein the range has a lower extreme value and a higher extreme value, and wherein the applying luminance mask supplies masked values which decrease from the lower extreme value to reach a minimum value at a lower border of the sub-range and keeps this minimum value in the sub-range.

3. The method of claim 2 wherein a higher border of the sub-range coincides with the higher extreme value.

4. The method of claim 2, wherein a high border of the sub-range has a value lower than the higher extreme value and that the masked values increase from the high border to the higher extreme value.

5. The method of claim 1, wherein the detail value is higher for an input pixel in the image portion with the higher high frequency content than in the image portion with the lower high frequency content.

6. The method of claim 2, wherein the masked value and the detail value are multiplied on a pixel by pixel basis to obtain a multiplied value, and wherein the gain of the non-linear function (NLF) is proportional to the multiplied value.

7. The method of claim 1, further comprising clipping the input pixel values before being detail filtered to at least obtain modified values clipped to at least one of a maximum clip level and a minimum clip level for input pixel values in a subrange between a lower extreme value and a higher extreme value.

8. The method of claim 1, further comprising
clipping the input pixel values before being detail filtered to obtain modified values which are clipped to a maximum clip level for input pixel values above a threshold value, and
further clipping the input pixel values to obtain further modified values which are clipped to a minimum value for input pixel values below a further threshold value, and
detail filtering the further modified values to obtain a further detail value for the particular one of the input pixels, wherein the gain of the non-linear function depends on the masked value, the detail value, and the further detail value.

9. An apparatus for enhancing details in an input image with pixels having input pixel being limited to a range, the apparatus comprising:
an averaging filter for averaging the input pixel values to obtain average brightness values,
a mask circuit for applying a luminance mask to the average brightness values to obtain a masked value corresponding to a particular one of the input pixels and being different for average brightness values in a sub-range than for pixels outside the sub-range,
a detail filter for detail filtering the input pixel values to obtain a detail value indicative for an amount of detail corresponding to the particular one of the input pixels, and
a non-linear circuit for applying a non-linear function to the input pixel values to obtain for at least one of the input pixel values a corresponding output pixel value, a gain of the non-linear function depending on both the masked value and the detail value determined for the particular one of the input pixels, wherein the gain is higher for an input pixel with input pixel values outside the sub-range than for an input pixel with input pixel values inside the sub-range, and wherein the gain is higher for an input pixel for which the detail value indicates more high frequency content in an image portion around the particular input pixel than for an input pixel for which the detail value indicates less high frequency content.

10. The apparatus of claim 9, further comprising:
a signal processing circuit for supplying the input pixel values,
a driver for processing the output pixel values to obtain drive signals, and
a display device for displaying the drive signals.

11. A non-transitory tangible storage medium having stored thereon processor-readable code to enable a processor to execute an algorithm for enhancing details in an input image with input pixels having input pixel values being limited to a range, the algorithm comprising:
average filtering the input pixel values to obtain average brightness values,
applying a luminance mask to the average brightness values to obtain a masked value being different for average brightness values in a sub-range of the range than for pixels outside the sub-range,
detail filtering the input pixel values to obtain a detail value indicative for an amount of detail, and
applying a non-linear function to the input pixel values to obtain for at least one of the input pixel value a corresponding output pixel value, a gain of the non-linear function being dependent on both the masked value and detail value both determined for a same one of the input pixels, wherein the gain is higher for an input pixel with input pixel values outside the sub-range than for an input pixel with input pixel values inside the sub-range, and wherein the gain is higher for an input pixel for which the detail value indicates more high frequency content in an image portion around the particular input pixel than for an input pixel for which the detail value indicates less high frequency content.

12. The apparatus of claim 9, further comprising:
an image sensor for supplying an image sensor signal, and
processing circuit for receiving the image sensor signal to supply the input pixel values.

13. The apparatus of claim 12, wherein the non-linear circuit generates a plurality of output pixel values, and wherein the apparatus generates an output image from the output image values, the apparatus further comprising:
a display screen for displaying the output image; and
a telephony device.

14. The method of claim 1, wherein the non-linear function is one of a gamma function and a sigmoidal function.

15. The apparatus of claim 9, wherein the non-linear circuit applies one of a gamma function and a sigmoidal function to the input pixel values.

16. The non-transitory tangible storage medium of claim 11, wherein the non-linear function is one of a gamma function and a sigmoidal function.

* * * * *